United States Patent [19]

Nakamura et al.

[11] Patent Number: 5,173,224
[45] Date of Patent: Dec. 22, 1992

[54] FUZZY INFERENCE THERMOCONTROL METHOD FOR AN INJECTION MOLDING MACHINE WITH A PID CONTROL

[75] Inventors: Nobuyuki Nakamura; Masashi Suganuma, both of Sakaki, Japan

[73] Assignee: Nissei Jushi Kogyo Kabushiki Kaisha, Nagano, Japan

[21] Appl. No.: 754,765

[22] Filed: Sep. 4, 1991

[30] Foreign Application Priority Data

Sep. 10, 1990 [JP] Japan .................................. 2-240429

[51] Int. Cl.$^5$ .............................................. B29C 45/78
[52] U.S. Cl. ............................. 264/40.6; 264/328.14; 425/144; 364/476; 395/900
[58] Field of Search .................... 264/40.1, 40.3, 40.4, 264/40.5, 40.6, 328.14, 328.15, 328.16; 425/135, 140, 141, 143, 144, 145, 149, 161, 162, 169, 170, 173, 542; 395/900; 364/476

[56] References Cited

U.S. PATENT DOCUMENTS

| | | | |
|---|---|---|---|
| 3,822,867 | 7/1974 | Evans | 425/144 |
| 4,094,940 | 6/1978 | Hold | 264/40.6 |
| 4,707,310 | 11/1987 | Debeaud | 264/328.14 |
| 4,841,459 | 6/1989 | Ikeda et al. | 364/476 |
| 4,899,288 | 2/1990 | Tsutsumi | 364/476 |
| 4,911,629 | 3/1990 | Fujita | 264/40.6 |
| 5,012,430 | 4/1991 | Sakurai | 395/900 |
| 5,043,862 | 8/1991 | Takahashi | 395/900 |

OTHER PUBLICATIONS

Maiers and Sherif, IEEE Transactions On System, vol. SMC-15, No. 1, "Applications of Fuzzy Set Theory", Jan./Feb. 1985, pp. 175–189.

McCusker, Tom, Control Engineering, "Neural Networks and Fuzzy Logic, Tools of Promise for Controls", May 1990, pp. 84, 85.

*Primary Examiner*—Jill L. Heitbrink

[57] ABSTRACT

To perform automatic PID control corresponding a status of an injection molding machine for eliminating a temperature overshoot or an undershoot during thermocontrol of thermocontrolled components of the injection molding machine, the Fuzzy Control theory is used for controlling the injection molding machine. By using the Fuzzy Control system, the object temperature of the thermocontrolled components can be attained with practically eliminated overshoot and undershoot.

10 Claims, 4 Drawing Sheets (A) STATUS OF THE INJECTION MOLDING MACHINE (B) TEMP. DEVIATION (C) RATE OF DEVIATION CHANGE (E) CONTROL VOLTAGE (Kp)

FUZZY INFERENCE THERMOCONTROL METHOD FOR AN INJECTION MOLDING MACHINE WITH A PID CONTROL

BACKGROUND OF THE INVENTION

The present invention relates to a thermocontrol method for an injection molding machine, more precisely relates to a method for controlling temperature of thermocontrolled components, e.g. an injection cylinder, of the injection molding machine to correspond to the instant operating status thereof.

Conventionally, PID (Proportional-Integral-Differential) control method is usually adopted to control the temperature of thermocontrolled components, e.g. an injection cylinder, of an injection molding machine.

The PID control method is based on a proportional action (P), which is in proportion to a control deviation; an integral action (I), which is based on an integrated value of the control deviation; and a differential action (D), which is based on differential coefficients of the thermocontrolled components.

The PID control is performed on the basis of a following numerical formula:

$$Y = Kp \left[ \epsilon + Td \frac{d\epsilon}{dt} + \frac{1}{Ti} \int \epsilon dt \right]$$

Y: control value
t: time
$\epsilon$: control deviation
Kp: proportional sensivity
Td: differential time
Ti: integrated time In the PID control, actional sensitivities of the P, I and D controls can be adjusted by changing the coefficients Kp, Td and Ti. Note that, the D control can be eliminated when the coefficient Td is zero; the I control can be eliminated when the coefficient Ti is infinitely great, so P control, PI control or PD control may be adopted if possible.

Using the PID control, temperature can be maintained when the thermocontrolled components are under certain stable conditions.

However, the injection molding machine has various operating states such as stop, temperature rise, mold, pause, etc.. Furthermore, heating elements and cooling elements are different devices in each status.

For example, in the temperature rise state of an injection cylinder, radiant heat is the main cooling element. On the other hand, heat from the heater, the heat of friction caused by an injection screw acting upon the resin, etc. are the heating elements in the mold status; while the natural radiant heat, the endothermic reaction by resin supplied, etc. are the cooling elements therein.

Therefore, in conventional PID control where each control value is fixed even if the status of the injection molding machine changes, the temperature of an injection cylinder, for example, may be higher (overshoot, $P_o$) or may be lower (under shoot, $P_u$) than the object temperature, as shown as a curve P in FIG. 5: A Temperature Graph of the Injection Cylinder. The overshoot $P_o$ and undershoot $P_u$ of the injection cylinder have a large effect on the viscosity of molten resin, so that they may become factors in inferior production quality. Moreover, the overshoot $P_o$ causes resin deterioration when the object temperature is exceeded and the resin deterioration temperature is attained, resulting in inferior products.

When precise control is required, to avoid inferior production quality, manual control of the temperature of the injection cylinder, based on the experience of a skilled operator, is required because automatic precise control cannot be performed by conventional PID control.

On the other hand, to eliminate overshoot and the undershoot for thermocontrol of the injection cylinder, etc. by the PID control, the PID control should be always performed corresponding to the status of the injection molding machine.

SUMMARY OF THE INVENTION

An object of the present invention is to provide a thermocontrol method for an injection molding machine, which is capable of eliminating the overshoot and the undershoot with respect to the object temperature of thermocontrolled components, e.g. the injection cylinder, as much as possible and which is capable of automatic PID control.

To achieve the object, the inventor determined that it is effective to change the coefficients Kp, Ti and Td, which define the actional sensitivities of the P, I and D controls, to correspond to the states of the injection molding machine, and that the Fuzzy Control theory would prove effective for determining the coefficients, and thus created the present invention.

Namely, the thermocontrol method of the present invention, which controls thermocontrolled components to maintain an object temperature corresponding to an operating a status of the injection molding machine comprising the step of performing PID control for controlling means for heating or cooling the thermocontrolled components of the injection molding machine, the PID control including a proportional control in proportion to deviation between the object temperature of the thermocontrolled components and the present temperature thereof, an integrated control based on integrated value of the deviation, and a differential control based on the differential coefficient of the rate of deviation change with respect to time, wherein the improvement comprises the steps of:

detecting the operating status of the injection molding machine and the temperature of the thermocontrolled components thereof;

calculating the deviation between the object temperature of the thermocontrolled components corresponding to the present status of the injection molding machine and the present temperature detected, and the rate of deviation change between the present deviation and the previous deviation;

performing fuzzy inference to define coefficients for defining actional sensitivities of the proportional control, the integrated control and the differential control as fuzzy variables by inferring the status of the injection molding machine, the deviation calculated and the rate of deviation change, wherein the status of the injection molding machine, the temperature deviation, the rate of deviation change and the control value of the means for heating or the means for cooling are defined as fuzzy variables, and wherein the inference is based on rules governing a mutual relationship among membership functions and groups into which the member grades assigned to previously and optionally divided areas which correspond to respective optional values of the fuzzy variables; and calculating actual actional sensitivities of the proportional control, the integrated control and the differential control on the basis of the fuzzy inference.

In the present invention, the Fuzzy Control theory is used for defining the coefficients of the PID control corresponding to the states of the injection molding machine, so that the most preferable PID control can be performed.

Furthermore, the Fuzzy Control theory is used for controlling the temperature of the thermocontrolled components such as the injection cylinder, so that changing the control value of the means for heating and cooling, which are assembled in the injection cylinder and molds, etc. can be automatically executed as if by a skilled operator.

By utilizing the Fuzzy Control theory, the actual temperature of the thermocontrolled components can quickly reach the object temperature, during which period temperature overshoot and undershoot can be eliminated as much as possible.

BRIEF DESCRIPTION OF THE DRAWINGS

The present invention will become more fully understood from the detailed description give hereinbelow and the accompanying drawings which are given by way of illustration only, and thus are not limitative of the present invention and wherein.

DETAILED DESCRIPTION OF PREFERRED EMBODIMENT

Preferred embodiments of the present invention will now be described in detail with reference to the accompanying drawings.

Figure 1:
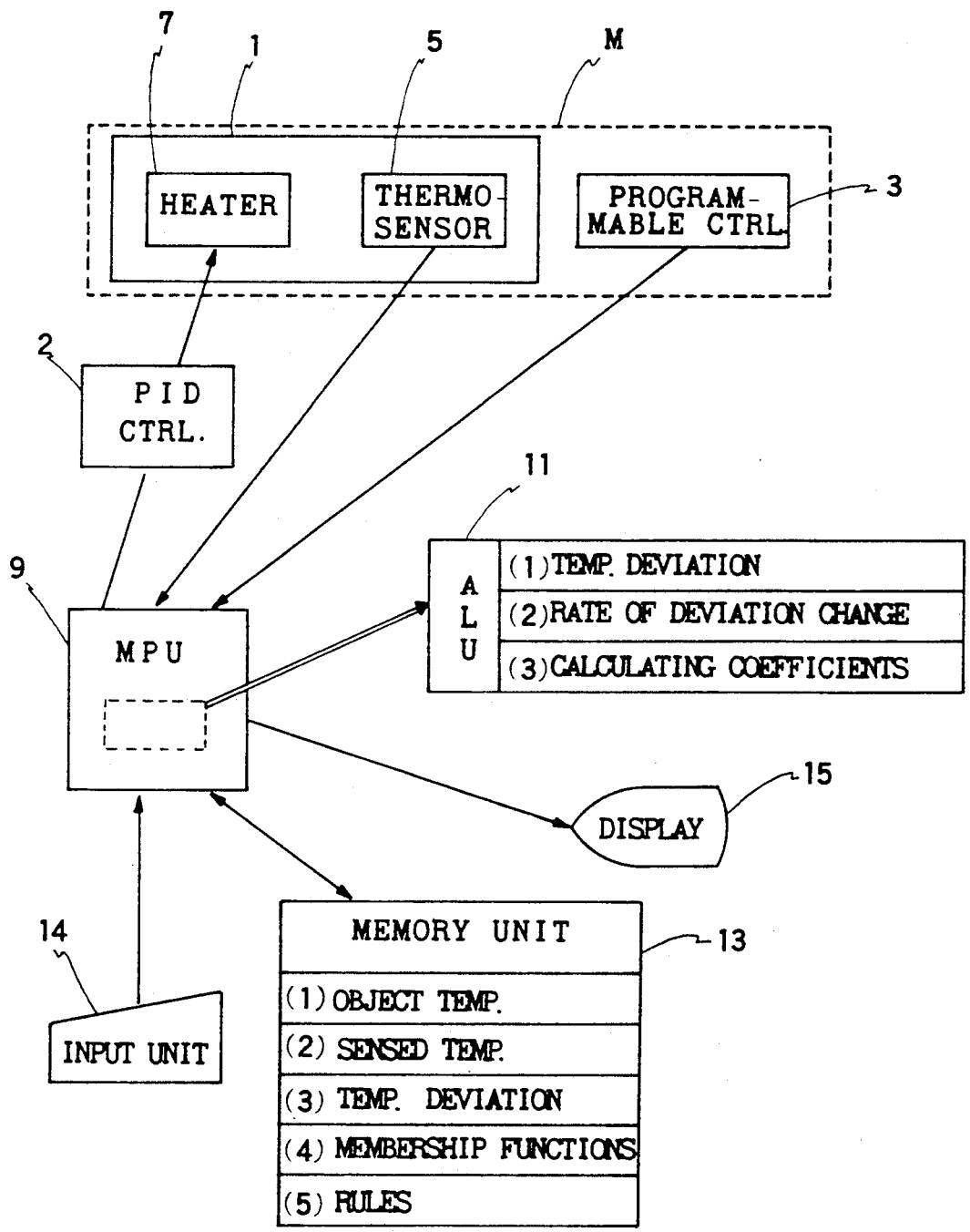
FIG. 1 is a block diagram showing an embodiment of the present invention.

FIG. 1 is a block diagram showing the present embodiment.

In FIG. 1, and injection molding machine M has an injection cylinder 1. The injection cylinder 1 has a thermosensor 5 for detecting the temperature of the injection cylinder 1 and an electric heater 7 for heating the injection cylinder 1. A rated voltage of the heater 7 is 200 V. by a programmable controller 3, so that each state, e.g. stop, temperature rise, mold, pause, etc., of the injection molding machine M is initiated by the data from the programmable controller 3.

The sensor 5 and the heater 7 may be the same as those which are conventionally used for injection molding machines.

Note that, the injection cylinder 1 excludes a nozzle portion, which comes into contact with molds.

Signals from the controller 3 are sent to a microprocessor (MPU) 9 to indicate the present operating status of the injection molding machine M: temperature rise, mold, pause, etc.

The object temperature of the injection cylinder 1 corresponding to the present operating state (A) of the injection molding machine M, which is known by the MPU 9, is defined on the basis of temperature data stored in an area (1) of a computer memory 13.

Signals indicating the detected temperature from the sensor 5 of the injection cylinder 1 are also sent to the MPU 9 and written in an area (2) of the memory 13. Temperature deviation (B) between the object temperature, which has been defined on the basis of the signals from the controller 3, and the detected temperature, which is detected by the sensor 5, is calculated by an arithmetic logical unit (ALU) 11 in the MPU 9, and written in an area (3) of the memory 13.

Additionally, the ALU 11 calculates the rate of deviation change (C), which is the change rate between the present temperature deviation—the latest data—and the previous temperature deviation, which has been stored in the area (3) of the memory 13.

The value (A) indicating the status of the injection molding machine M, the temperature deviation (B) and the rate of deviation change (C) will be data for the fuzzy inference, which is based on membership functions and rules, described later.

Then, the coefficients Kp for the actional sensitivity of the P control, Ti for the actional sensitivity of the I control and Td for the actional sensitivity of the D control are calculated on the basis of fuzzy inference by the ALU 11. The calculated coefficients are sent to a PID controller 2 for controlling the heater 7.

The PID controller 2 changes the actional sensitivities of the P, I and controls on the basis of the coefficients sent from the MPU 9, and controls the control value of the heater 7 on the basis of the present temperature of the injection cylinder 1 sent from the sensor 5 to the MPU 9.

The above stated sequence, from reading data to sending control signals, will be continuously repeated, so that the most preferable PID control corresponding to the state of the injection molding machine can be always performed.

Note that, the contents of the memory 13 can be shown on a display unit 15, e.g. CRT, and can be corrected with an input unit 14, e.g. keyboard.

Figure 2:
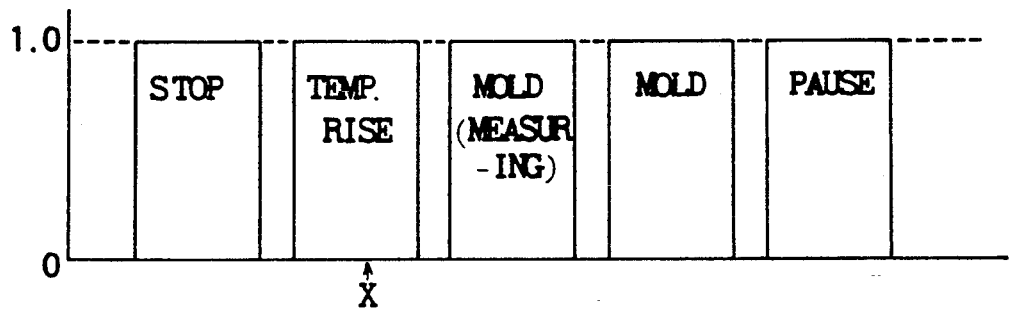
FIG. 2 is an explanatory view showing membership functions.
Figure 2:
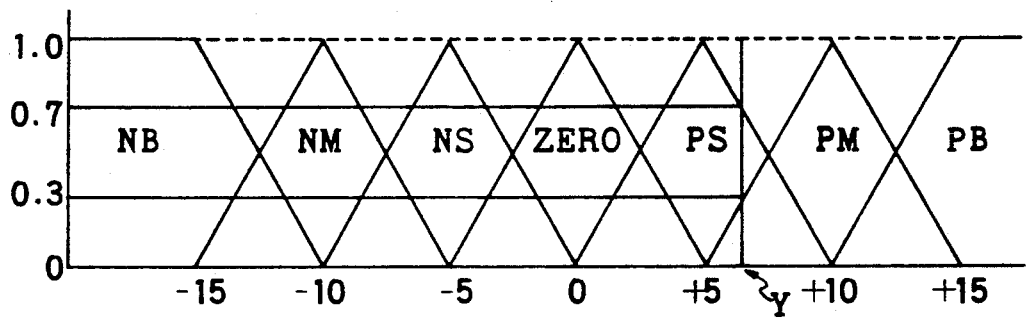
Figure 2:
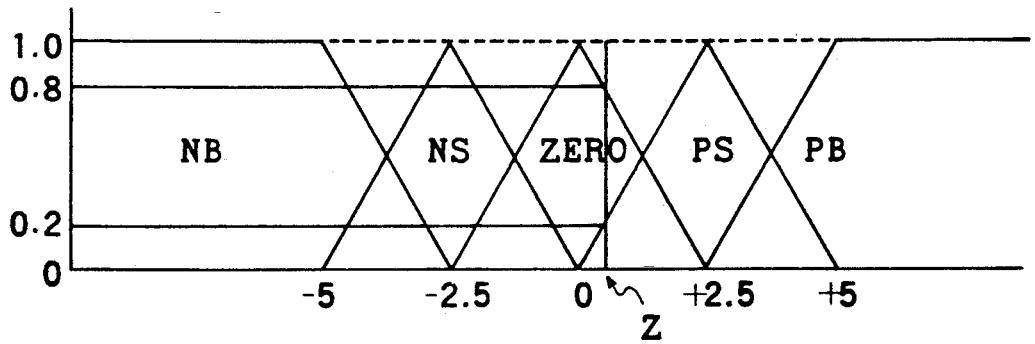
Figure 2:
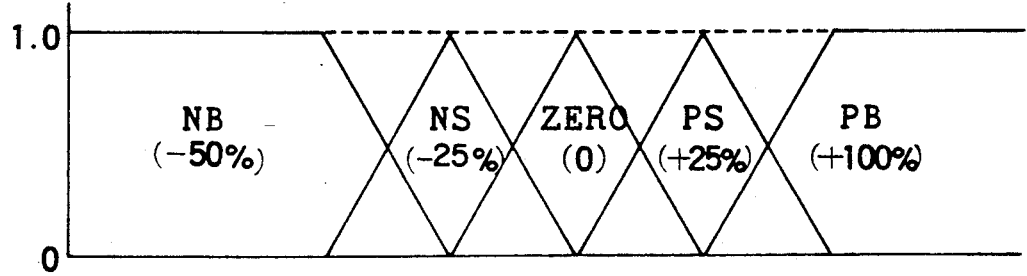

The membership functions for each fuzzy variable have been stored in an area (4) of the memory 13 (see FIG. 2). The fuzzy variables are: the value (A) indicating the status of the injection molding; the temperature deviation (B); the rate of deviation change (C); and the degree of output for operation (E), which includes the coefficients Kp, Ti and Td.

Each membership function is divided into a plurality of groups including or excluding mutual overlapped sectors. Each group has been respectively assigned a grade (0–1).

The membership function for the fuzzy variable (A) is divided into five distinct groups. The grades of the groups are "0" or "1".

The membership function for the fuzzy variable (B) is divided into seven groups with overlapped sectors. Five groups of the seven are graphically depicted as triangles. In the graph, temperature change is indicated along the horizontal axis—the base edge of the overlapping triangular groups—and is defined in 10° C. increments which correspond to the length of each triangular group's base edge.

The membership function for the fuzzy variable (C) is divided into five groups with overlapped sectors. Three groups of the five are also graphically depicted as triangles. In the triangular groups, the rate of deviation change at the base edge is defined in 5° C. increments which correspond to the length of each triangular group's base edge.

The membership function for the fuzzy variable (E) is assigned to each coefficient of the P, I and D controls. The coefficients shown in FIG. 2 are mainly the coefficient Kp.

The range of the coefficient Kp is 1–100%. The range is divided into 5 groups with overlapped sectors of 25%. The central value is 50%. The three groups out of the five are graphically depicted as triangles.

Note that, in the present embodiment, the membership functions of the (B), (C) and (E) will be 0–1 as shown the vertical axis of the graph in FIG. 2.

The relationship among the groups of each membership function is defined by a rule previously stored in an area (5) of the memory 13.

A rule for temperature rise status, as an example, is shown in the following TABLE.

TABLE

| No. | if INPUT A | B | C | then OUTPUT E |
|---|---|---|---|---|
| 1 | TEMP. RISE | NB | NB | PB |
| 2 | TEMP. RISE | NB | NS | PB |
| 3 | TEMP. RISE | NB | ZERO | PB |
| 4 | TEMP. RISE | NB | PS | PB |
| 5 | TEMP. RISE | NB | PB | PB |
| 6 | TEMP. RISE | NM | NS | PB |
| 7 | TEMP. RISE | NM | PS | PS |
| 8 | TEMP. RISE | NM | PS | PS |
| 9 | TEMP. RISE | NM | PB | PS |
| 10 | TEMP. RISE | NM | PB | PS |
| 11 | TEMP. RISE | NS | NB | PB |
| 12 | TEMP. RISE | NS | NS | PS |
| 13 | TEMP. RISE | NS | ZERO | PS |
| 14 | TEMP. RISE | NS | PS | ZERO |
| 15 | TEMP. RISE | NS | PB | ZERO |
| 16 | TEMP. RISE | ZERO | NB | PS |
| 17 | TEMP. RISE | ZERO | NS | PS |
| 18 | TEMP. RISE | ZERO | ZERO | ZERO |
| 19 | TEMP. RISE | ZERO | PS | NS |
| 20 | TEMP. RISE | ZERO | PB | NS |
| 21 | TEMP. RISE | PS | NB | PS |
| 22 | TEMP. RISE | PS | NS | ZERO |
| 23 | TEMP. RISE | PS | ZERO | ZERO |
| 24 | TEMP. RISE | PS | PS | NS |
| 25 | TEMP. RISE | PS | PB | NB |
| 26 | TEMP. RISE | PM | NB | NS |
| 27 | TEMP. RISE | PM | NS | NS |
| 28 | TEMP. RISE | PM | ZERO | NB |
| 29 | TEMP. RISE | PM | PS | NB |
| 30 | TEMP. RISE | PM | PB | NB |
| 31 | TEMP. RISE | PB | NB | NB |
| 32 | TEMP. RISE | PB | NS | NB |
| 33 | TEMP. RISE | PB | ZERO | NB |
| 34 | TEMP. RISE | PB | PS | NB |
| 35 | TEMP. RISE | PB | PB | NB |

In the TABLE, the INPUTs A, B and C in the "if" column respectively indicate the fuzzy variables (A), (B) and (C). On the other hand, the OUTPUT E in the "then" column indicates the fuzzy variables (E).

In the horizontal direction of the TABLE, for example in row 1, the relationship among the INPUTs A, B and C is logical "AND"; in the vertical direction thereof, for example, the relationship between row 1 and row 2 is logical "OR".

Note that, there are shown in the TABLE all combinations of all the groups in the membership function, but combinations impossible or very rare may be omitted from the TABLE.

Next, the fuzzy inference will be explained. Note that, this case will be explained under the following conditions: the variable (A), Operating Status, is X (temperature rise); the variable (B), Latest Temperature Change, is Y; and the variable (C), Latest Rate of Change is Z.

In the position Y of the variable (B), the groups "PS" and "PM" are overlapped; in the position Z of the variable (C), the groups "ZERO" and "PS" are overlapped.

Figure 3:
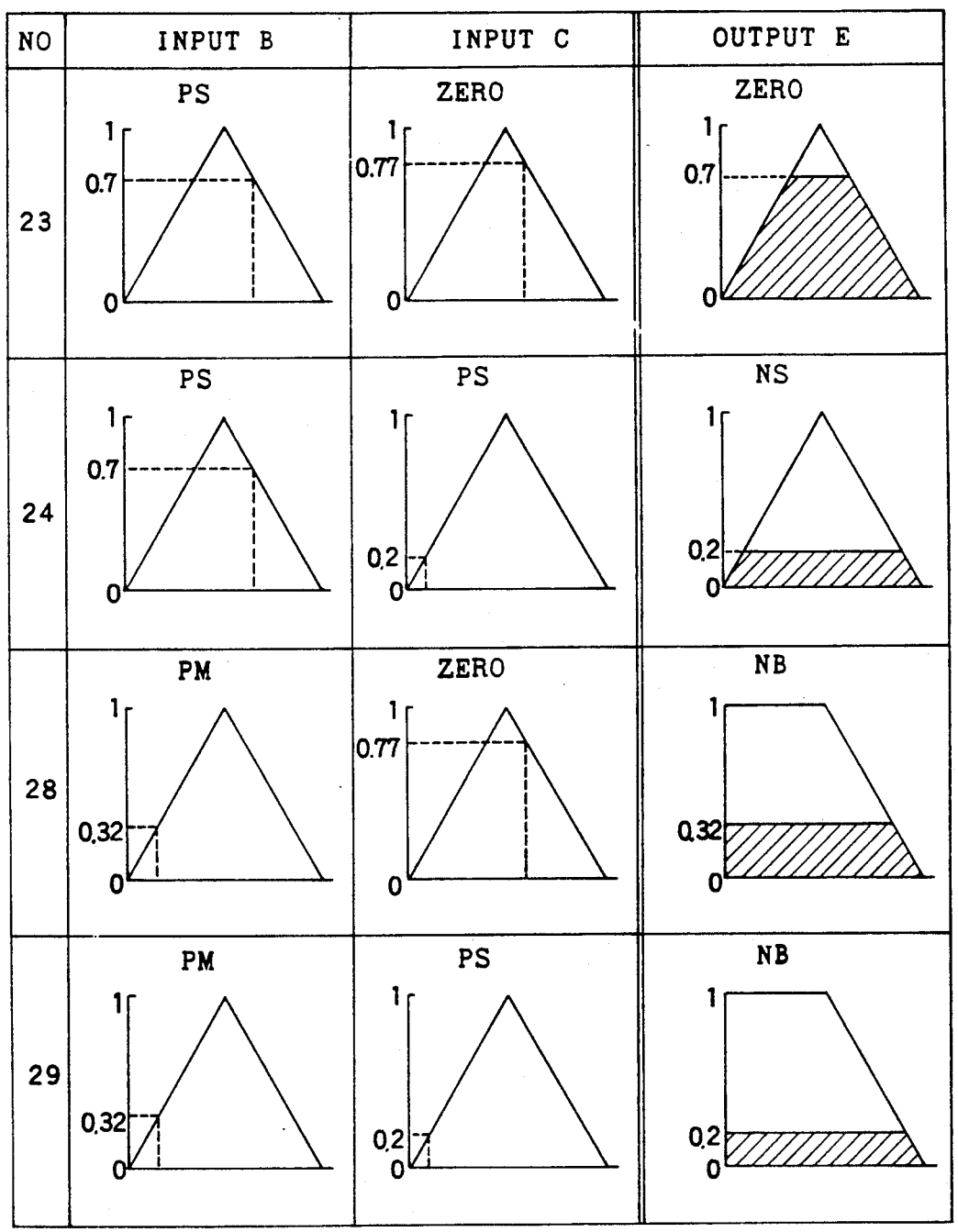
FIG. 3 is an explanatory view showing examples of Fuzzy inference.

Therefore, combinations of the INPUTs A, B and C result in four rules, which are shown in FIG. 3 as rules No. 23, 24, 28 and 29.

The relationship among the INPUTs A, B and C in each rule is logical "AND", so that the OUTPUT E will infer a range including the INPUTs A, B and C. Namely, the range of the OUTPUT E is shown as area which is partitioned by minimum input values of the INPUTs A, B and C, marked by the shaded area in FIG. 3.

The coefficient Kp, which is inferred from the OUTPUT E of each combination and is sent to the PID controller 2, is calculated by the ALU 11.

The steps of the calculation will be explained.

Figure 4:
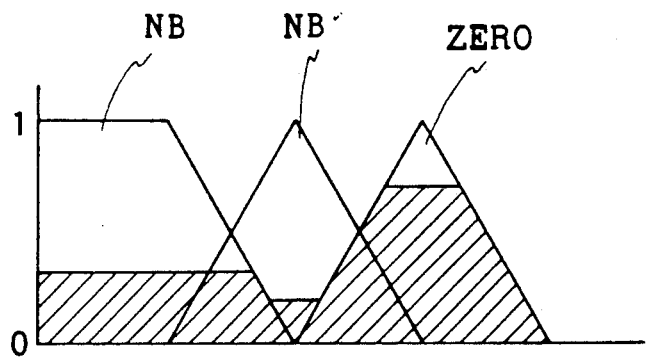
FIG. 4 is an explanatory view showing the steps of calculating control values.

First, the inferred range, of each OUTPUT E is composed as shown in FIG. 4.

Next, the centroid of the inferred range in FIG. 4 is determined and the coefficient Kp. And the coefficients Td and Ti are also determined by the same manner based on the membership functions and the rules.

The coefficients Kp, Ti and Td determined are sent from the MPU 9 to the PID controller 2 so as to control the input voltage of the heater 7.

Figure 5:
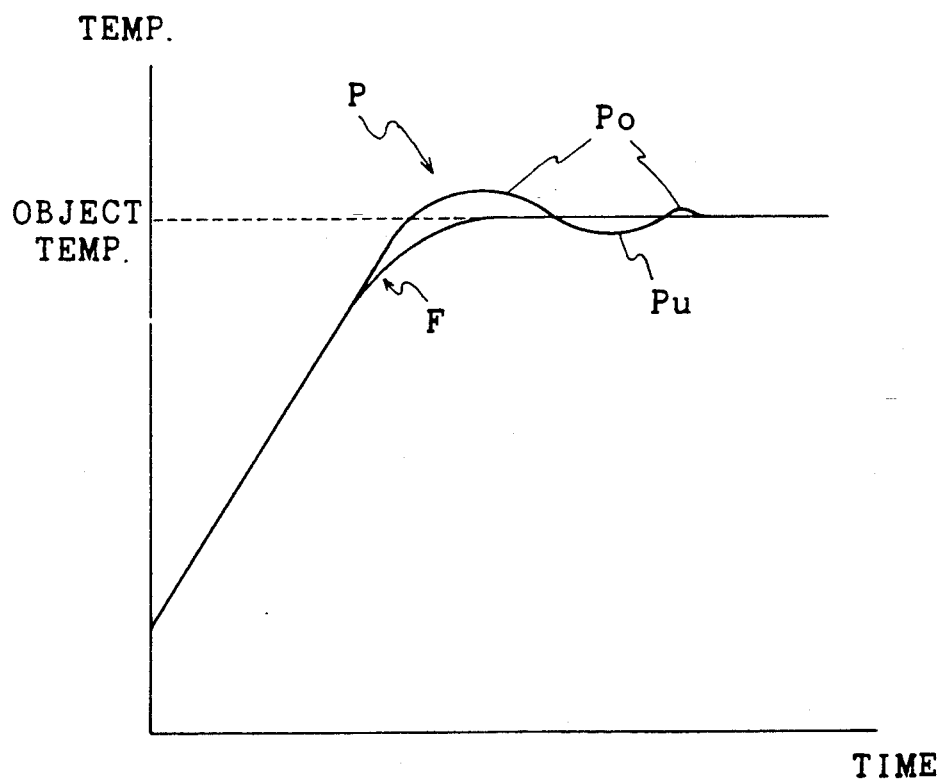
FIG. 5 is a graph showing the temperature control of the injection cylinder.

Utilizing the above described Fuzzy Control theory, temperature overshoot $P_o$ and undershoot $P_u$ (see the graph F in FIG. 5) in the injection cylinder 1 can be eliminated, and the temperature of the injection cylinder 1 is automatically adjusted to correspond to the object temperature of the instant operating state of the injection molding machine M. Furthermore, inferior production can be prevented. Even in cases of using a resin with low thermostability, no manual control by experienced operators is required.

Note that, in the present embodiment, new membership functions, e.g. a deviation between the current rate of change and previous rate thereof, may be added to the membership functions shown in FIG. 2.

In the present embodiment, an injection nozzle, which may be provided to the front end of the injection cylinder, may also be controlled utilizing the Fuzzy Control theory as applied to the injection cylinder.

Furthermore, the injection cylinder and the nozzle may have a plurality of heaters, which are arranged longitudinally and each heater may be controlled on the basis of the fuzzy inference. In this case, the temperature can be very precisely controlled.

The temperature of the molds also needs precise control, so they too may be controlled on the basis of the fuzzy inference.

There are provided means for heating, e.g. an electric heater, and means for cooling, e.g. a water circulation pipe, in some molds. In this case, the means for heating and cooling may be controlled on the basis of the fuzzy theory, so that the overshoot and the undershoot can be eliminated as much as possible. Thus, an unskilled operator using a preprogrammed Fuzzy Control system is capable of controlling the temperature of the molds as if he were a skilled operator.

In the present invention, the temperature of the thermocontrolled components is capable of automatically adjusting to the object temperature corresponding to the operating status of the injection molding machine by PID control. During the aforedescribed automated thermocontrol, overshoot and undershoot are eliminated as much as possible. Therefore, the present invention contributes to the effective operation of injection molding machines and to the reduction of inferior molded products.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A thermocontrol method for an injection molding machine so as to control thermocontrolled components to maintain an object temperature corresponding to an operating status of the injection molding machine comprising the step of performing PID control for controlling means for heating or cooling the thermocontrolled components of the injection molding machine, the PID control including a proportional control in proportion to deviation between the object temperature of the thermocontrolled components and the present temperature thereof, an integrated control based on integrated value of the deviation, and a differential control based on the differential coefficient of the rate of deviation change with respect to time, wherein the improvement comprises the steps of;

detecting the operating status of the injection molding machine and the temperature of the thermocontrolled components thereof;

calculating the deviation between the object temperature of the thermocontrolled components corresponding to the present status of the injection molding machine and the present temperature detected, and the rate of deviation change between the present deviation and the previous deviation;

performing fuzzy inference to define coefficients for defining actional sensitivities of the proportional control, the integrated control and the differential control as fuzzy variables by inferring the status of the injection molding machine, the deviation calculated and the rate of deviation change, wherein the status of the injection molding machine, the temperature deviation, the rate of deviation change and the control value of the means for heating or the means for cooling are defined as fuzzy variables, and wherein the inference is based on rules governing a mutual relationship among membership functions and groups into which the member grades assigned to previously and optionally divided areas which correspond to respective optional values of the fuzzy variables;

calculating actual actional sensitivities of the proportional control, the integrated control and the differential control on the basis of the fuzzy inference; and controlling the temperature of the means for heating or cooling with the PID control.

2. The thermocontrol method for an injection molding machine according to claim 1,
wherein the thermocontrolled components are an injection cylinder or molds.

3. The thermocontrol method for an injection molding machine according to claim 2,
wherein the injection cylinder includes an injection nozzle provided to an end thereof.

4. The thermocontrol method for an injection molding machine according to claim 1,
wherein the fuzzy inference is respectively applied to each thermocontrolled component.

5. The thermocontrol method for an injection molding machine according to claim 1,
wherein each membership function is divided into a plurality of groups which have mutually overlapping sectors when the membership functions are graphically depicted.

6. The thermocontrol method for an injection molding machine according to claim 5,
wherein the overlapped sectors are triangular when graphically depicted.

7. The thermocontrol method for an injection molding machine according to claim 1,
wherein the status of the injection molding machine is controlled by a programmable controller.

8. The thermocontrol method for an injection molding machine according to claim 1,
wherein the means for heating is an electric heater.

9. The thermocontrol method for an injection molding machine according to claim 1,
wherein the means for cooling is a water circulation pipe.

10. The thermocontrol method for an injection molding machine according to claim 1,
wherein the membership functions and the rules are previously stored in a memory unit of a computer.

* * * * *